(12) United States Patent
Pieschel (10) Patent No.: US 11,139,751 B2
(45) Date of Patent: Oct. 5, 2021

(54) MULTIPHASE MULTILEVEL POWER CONVERTER HAVING A DRIVE AND A PASSIVE FREQUENCY FILTER, AND METHOD FOR DRIVING THE MULTIPHASE MULTILEVEL POWER CONVERTER

(71) Applicant: SIEMENS ENERGY GLOBAL GMBH & CO. KG, Munich (DE)

(72) Inventor: Martin Pieschel, Altdorf (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 0 days.

(21) Appl. No.: 17/272,403

(22) PCT Filed: Aug. 27, 2018

(86) PCT No.: PCT/EP2018/072960
§ 371 (c)(1),
(2) Date: Mar. 1, 2021

(87) PCT Pub. No.: WO2020/043263
PCT Pub. Date: Mar. 5, 2020

(65) Prior Publication Data
US 2021/0249970 A1 Aug. 12, 2021

(51) Int. Cl.
*H02M 7/483* (2007.01)
*H02M 1/00* (2006.01)
*H02M 1/12* (2006.01)

(52) U.S. Cl.
CPC ....... *H02M 7/4835* (2021.05); *H02M 1/0012* (2021.05); *H02M 1/126* (2013.01)

(58) Field of Classification Search
CPC ............. H02M 7/53873; H02M 7/483; H02M 7/4835; H02M 1/0012; H02M 1/0003;
(Continued)

(56) References Cited

U.S. PATENT DOCUMENTS 8,390,259 B2  3/2013 Dommaschk et al.
2009/0268490 A1  10/2009 Wagoner et al.
(Continued)

FOREIGN PATENT DOCUMENTS

WO  WO2008086760 A1  7/2008

OTHER PUBLICATIONS

Qingrui Tu et al: "Impact of Sampling Frequency on Harmonie Distortion for Modular Multilevel Converter", IEEE Transactions on Power Delivery, IEEE; Service Center, New York, NY, US, Band 26, Nr. 1, 2011, pp. 298-306, XP011340622; ISSN: 0885-8977, DOI: 10.1109/TPWRD.2010.2078837, 2011.

*Primary Examiner* — Adolf D Berhane
(74) *Attorney, Agent, or Firm* — Laurence A. Greenberg; Werner H. Stemer; Ralph E. Locher (57) ABSTRACT

A multiphase multilevel power converter includes a phase module having submodules with an energy storage device. An energy storage device voltage is connectable and disconnectiable as a submodule voltage between two submodule poles. To attenuate higher-frequency components of the connection voltage, a passive frequency filter is provided for each phase module, having a resonant frequency above a sampling frequency of a digital regulating system connecting disconnected submodule voltages and disconnecting connected submodule voltages at successive sampling times. To avoid exciting the point of resonance of the frequency filter, the drive has a controller briefly connecting and again disconnecting at least one of the disconnected submodule voltages at least once within a sampling interval of the regulating system for a submodule voltage connected by the regulating system. A method for driving the multiphase multilevel power converter is also provided.

10 Claims, 8 Drawing Sheets

(58) Field of Classification Search
CPC ........ H02M 1/12; H02M 1/126; H02M 1/144; H02M 2007/4835; H02M 2001/0012
See application file for complete search history.

(56) References Cited

U.S. PATENT DOCUMENTS

2016/0380556 A1   12/2016  Peng et al.
2020/0044580 A1*  2/2020  Stankewitz .............. H02H 7/12
2020/0214161 A1*  7/2020  Fehmel ................ H05K 7/1432

* cited by examiner

FIG 4

Two-Pole Submodules

MULTIPHASE MULTILEVEL POWER CONVERTER HAVING A DRIVE AND A PASSIVE FREQUENCY FILTER, AND METHOD FOR DRIVING THE MULTIPHASE MULTILEVEL POWER CONVERTER

BACKGROUND OF THE INVENTION

Field of the Invention

The invention relates to a multiphase multilevel power converter having a phase module formed from a plurality of two-pole submodules electrically connected in series, which each have a plurality of semiconductor switches and an energy storage device that is chargeable in a unipolar manner, wherein the energy storage device voltage is able to be switched on and off as a submodule voltage between the two submodule poles by the semiconductor switches, the sum of the switched-on submodule voltages in each case forms the connection voltage having a predefined fundamental frequency, in order to damp components of the connection voltage that are at higher frequency than the fundamental frequency, a passive frequency filter is provided for each phase module, in each case a portion of the submodules has switched-on submodule voltages and a portion of the submodules has switched-off submodule voltages, including a drive having a digital regulator, which corrects the deviation of the connection voltage from a predefined target voltage by virtue of the fact that it switches on switched-off submodule voltages and switches off switched-on submodule voltages at respectively successive sampling instants in accordance with a predefined sampling frequency, and the frequency filter has a resonant frequency that is above the sampling frequency.

The invention also relates to a method for driving the multiphase multilevel power converter having a phase module formed from a plurality of two-pole submodules electrically connected in series, which each have a plurality of semiconductor switches and an energy storage device that is chargeable in a unipolar manner, wherein the energy storage device voltage is able to be switched on and off as a submodule voltage between the two submodule poles by the semiconductor switches, the sum of the switched-on submodule voltages in each case forms the connection voltage having a predefined fundamental frequency, in order to damp components of the connection voltage that are at higher frequency than the fundamental frequency, a passive frequency filter is provided for each phase module, in each case a portion of the submodules has switched-on submodule voltages and a portion of the submodules has switched-off submodule voltages, the frequency filter has a resonant frequency that is above a predefined sampling frequency, and by using a digital regulator, at respectively successive sampling instants, the deviations of the connection voltage from a predefined target voltage are detected and at least one of the switched-off submodule voltages is switched on or at least one of the switched-on submodule voltages is switched off.

Multiphase multilevel power converters are known and for example are electrically connected to a three-phase AC voltage power supply system.

Each multilevel power converter has a plurality of phase modules consisting of a plurality of two-pole submodules electrically connected in series. The submodules have a plurality of semiconductor switches and an energy store that is chargeable in a unipolar manner, wherein the energy store voltage dependent on the degree of charging of the energy store is able to be switched on and off as a submodule voltage by the semiconductor switches, said submodule voltage being present in each case between the two submodule poles.

The total current flowing through the multilevel power converter and thus through the phase modules is measured by means of a current sensor and the connection voltage is measured by means of a measuring transducer. The measured current and voltage measurement values are transmitted to a drive unit comprising a digital regulator, which, at respectively successive sampling instants with a predefined sampling frequency, detects the deviation of the connection voltage from a predefined target voltage, which is predefined in the form of target values, calculates the drive signals for the semiconductor switches of the submodules on the basis of the target values and corrects the deviation by means of the drive signals. The drive signals correspondingly switch the submodule voltages on and off. That is to say that a portion of the submodules and thus of the submodule voltages is in each case switched on and a portion of the submodules and thus of the submodule voltages is in each case not switched on (or, to put it another way, switched off). The sum of the switched-on submodule voltages forms in each case the connection voltage, that is to say the output voltage of the multilevel power converter, which does not change significantly owing to the dictates of regulation within a sampling interval, that is to say within the time period between two directly successive sampling instants. In this case, switched-on submodule voltages can in particular also remain switched on over a plurality of sampling intervals.

In order to damp higher-frequency components of the connection voltage, a passive frequency filter, in particular in the form of an LCL passive filter, is provided for each phase module. Frequency filters of this type have a resonant frequency that is expediently above the sampling frequency.

It is known that high-frequency disturbances that may occur during the switching of multiphase multilevel power converters are damped to a very great extent by passive frequency filters. Conflicting with this advantage is a very weakly damped resonance point that is excited in sudden jumps each time as a result of the switching of the individual submodules on the basis of switching decisions. The switching decisions are taken for example by means of a pulse width modulation or the switching heuristic known from WO 2008086760. If the resonance point is at significantly lower frequency than the switching frequency, the excitation of the resonance point can be sufficiently damped by means of sampling regulation. The reduction of the resonance point necessitates very large and thus expensive filter components. If the resonance point is above the sampling frequency, then a further excitation of the resonance point may even occur owing to aliasing effects.

SUMMARY OF THE INVENTION

The object of the invention is to drive a multiphase multilevel power converter comprising a passive frequency filter close to the sampling frequency such that the resonance point of the frequency filter, in particular of an LCL passive filter, is not excited.

This object is achieved by means of the features described below;

the dependent claims present advantageous configurations.

The solution relating to the multilevel power converter provides for the drive to have a controller, which, within a sampling interval of the regulator, in each case with respect to a submodule voltage UDC switched on by the regulator, (briefly) switches on and switches off again at least one of the switched-off submodule voltages UDC at least once for a first time duration T1, T2.

In particular, it is proposed that with respect to a submodule voltage UDC switched on by the regulator, the controller (briefly) switches on and switches off again a plurality of the respectively switched-off submodule voltages successively in a temporally spaced-apart manner.

Furthermore, it is proposed that with respect to a submodule voltage UDC switched on by the regulator, the controller (briefly) switches on and switches off again one of the switched-off submodule voltages UDC repeatedly in a temporally spaced-apart manner.

Expediently, the first time duration T1 is given by T1=1/(2*fr) where fr equals the resonant frequency.

Advantageously, it is proposed that a portion of the respectively switched-off submodule voltages UDC has a smaller (average) submodule voltage UDC than the other switched-off submodule voltages UDC (is operated with a smaller submodule voltage UDC), and that the controller (briefly) switches on and switches off again in each case only the smaller (average) submodule voltages UDC for the first time duration T1.

It is expedient here if the magnitude of the smaller submodule voltage UDC is half that of the other switched-off submodule voltages UDC.

Given four semiconductor switches per submodule, the damping can be further improved by virtue of the fact that with respect to a submodule voltage UDC switched on by the regulator, simultaneously with the switching on of this submodule voltage UDC (by the regulator), the controller (briefly) switches on and subsequently switches off again the smaller submodule voltage UDC in an inverted manner for the first time duration T1.

Alternatively, it is advantageous if all submodules have the same (average) submodule voltage UDC and, in each case with respect to a submodule voltage switched on by the regulator, the controller switches on and switches off again an odd number N−1 for the first time duration, then switches on these submodule voltages UDC (of these submodules) with an opposite sign (in an inverted manner) for a second time duration and, after the second time duration has elapsed, switches off again all submodule voltages UDC switched on (additionally) by the controller, wherein the following holds true for the first and second time durations T1, T2:

$T1=1/(2*pi*fr)*\arccos((4*(N*UDC)^2-2*(N*UDC)-UDC^2)/(4*(N*UDC)^2))$ and $T2=1/(2*pi*f\_r)*a\cos((2*(N*UDC)^2-2*(N*UDC)-UDC^2)/(2*(N+1)*UDC^2))$.

Expediently, the first and second time durations T1, T2 are chosen in a manner dependent on the total number of submodules.

The solution for driving the multiphase multilevel power converter provides that, within a sampling interval of the regulator, in each case with respect to a submodule voltage UDC switched on by the regulator, at least one of the switched-off submodule voltages UDC is (briefly) switched on and switched off again at least once for a first time duration T1 that is less than the sampling interval.

The solutions relating to the multilevel power converter and the method exhibit a significantly smaller excitation of the passive frequency filter and a more effective damping of disturbances. Moreover, the component loading is lower particularly in the case of an LCL filter.

The essence of the solutions is the time-staggered switching of the stepped submodule voltages, such that the resonance point is hardly excited particularly in the case of an LCL filter.

An additional factor is a better noise emission behavior of the multilevel power converter. Moreover, the project risk with regard to EMC acceptance is lower.

The invention is described in greater detail below on the basis of an exemplary embodiment.

DETAILED DESCRIPTION OF THE INVENTION

Figure 1:
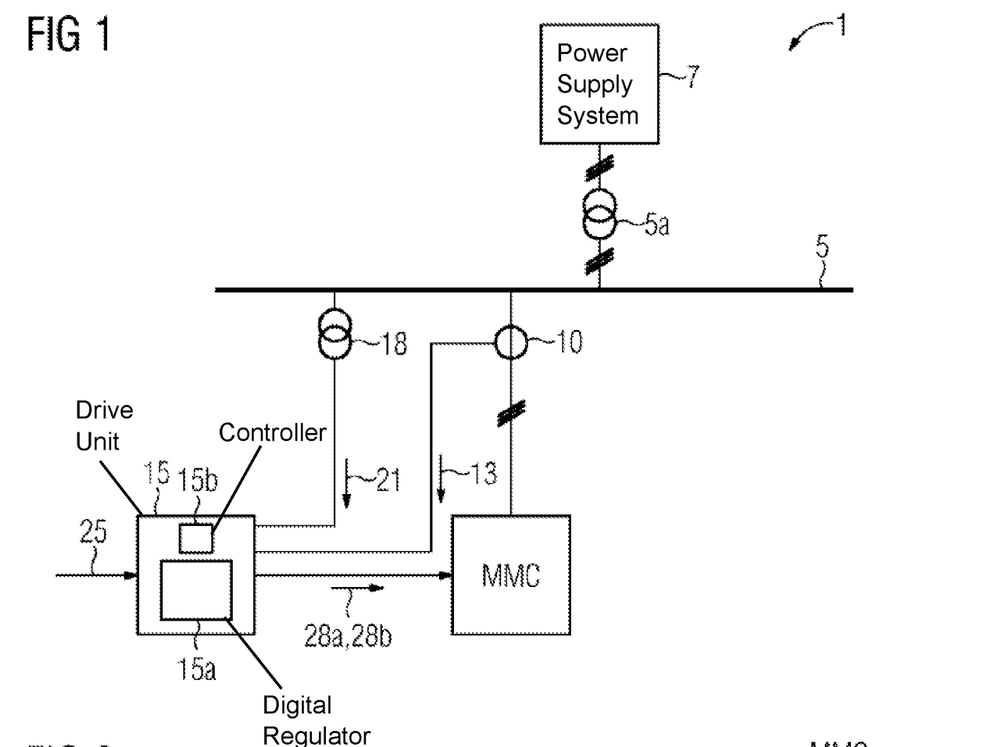
FIG. 1 shows an arrangement comprising a modular multilevel power converter.

FIG. 1 illustrates an arrangement 1 comprising a modular multilevel power converter MMC (Modular Multilever Converter). The modular multilevel power converter MMC is electrically connected to a power supply system 7 in a three-phase manner via a connection rail 5 and a transformer 5a. In the exemplary embodiment, the power supply system 7 is a three-phase AC voltage power supply system. The current flowing through the multilevel power converter MMC is measured by means of a current sensor 10. The current measurement values 13 are transmitted to a drive unit 15 for the modular multilevel power converter MMC. Furthermore, the voltage across the connection rail 5, the connection voltage, is measured by means of a voltage sensor 18 (embodied here as a measuring transducer). This voltage substantially corresponds to the voltage across the modular multilevel power converter MMC. The voltage values of the connection voltage 21 are transmitted to the drive unit 15.

The drive unit 15 comprises a digital regulator 15a and a controller 15b.

The regulator 15a of the drive unit 15 calculates drive signals 28a on the basis of predefined target values 25, said drive signals being transmitted to the modular multilevel power converter MMC. The multilevel power converter MMC is driven by means of said drive signals 28a in such a way that the desired connection voltage is established on the connection rail 5. The regulator 15a of the drive unit 15 controls the multilevel power converter MMC in this way.

Figure 2:
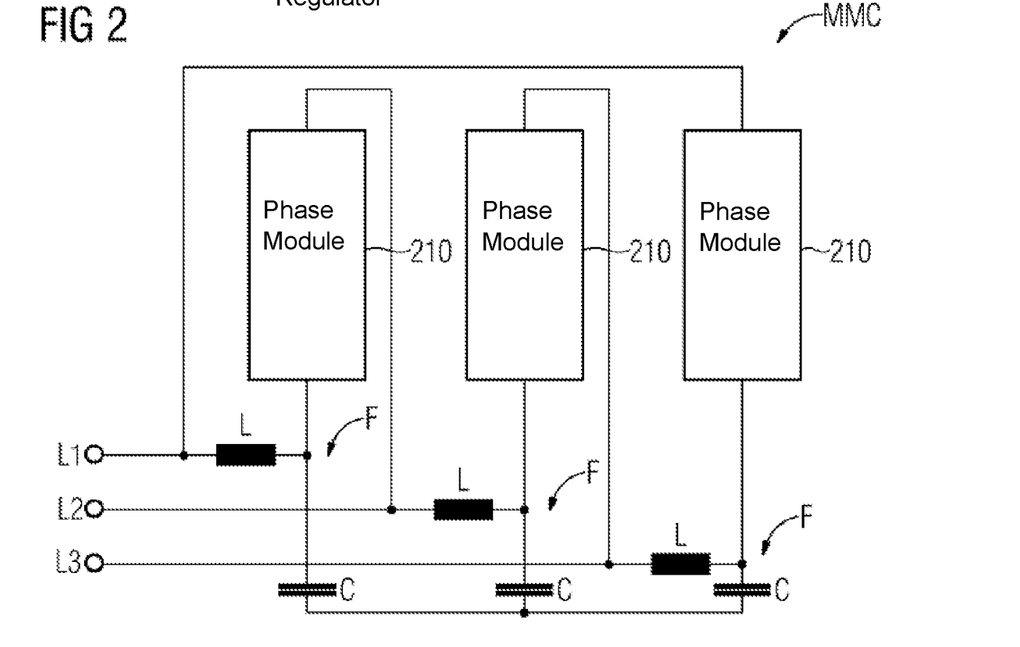
FIG. 2 shows a multilevel power converter comprising three phase modules.

FIG. 2 illustrates an exemplary embodiment of a multilevel power converter MMC having three phase modules 210. The three phase modules 210 are connected in a delta connection with system inductors L and filter capacitances C and are connected to three phases L1, L2 and L3 of the power supply system 7. The construction of the phase modules 210 is shown in FIG. 4.

Figure 3:
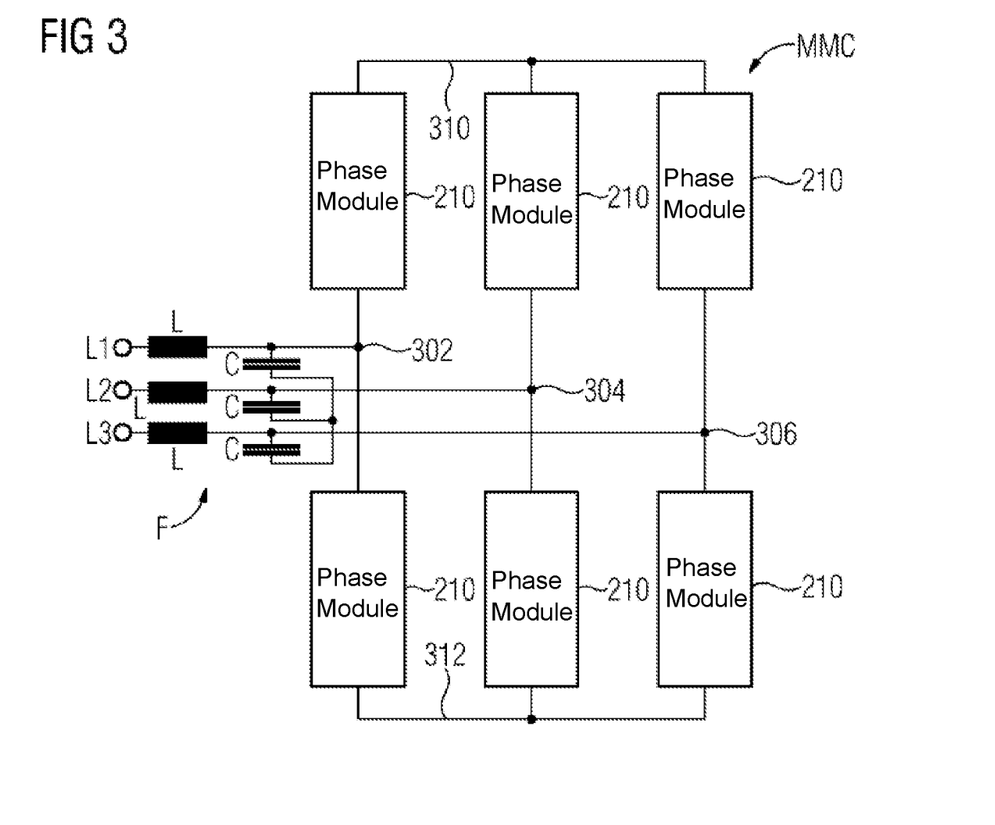
FIG. 3 shows a multilevel power converter comprising six phase modules.

FIG. 3 illustrates an exemplary embodiment of a multilevel power converter MMC having six phase modules 210. The six phase modules 210 are arranged in a bridge circuit (here: in a B6 bridge circuit) once again with system inductors L and filter capacitances C. Here in each case one connection of a first phase module and one connection of a second phase module are electrically connected to one another and form an AC voltage connection 302, 304 or 306.

Figure 4:
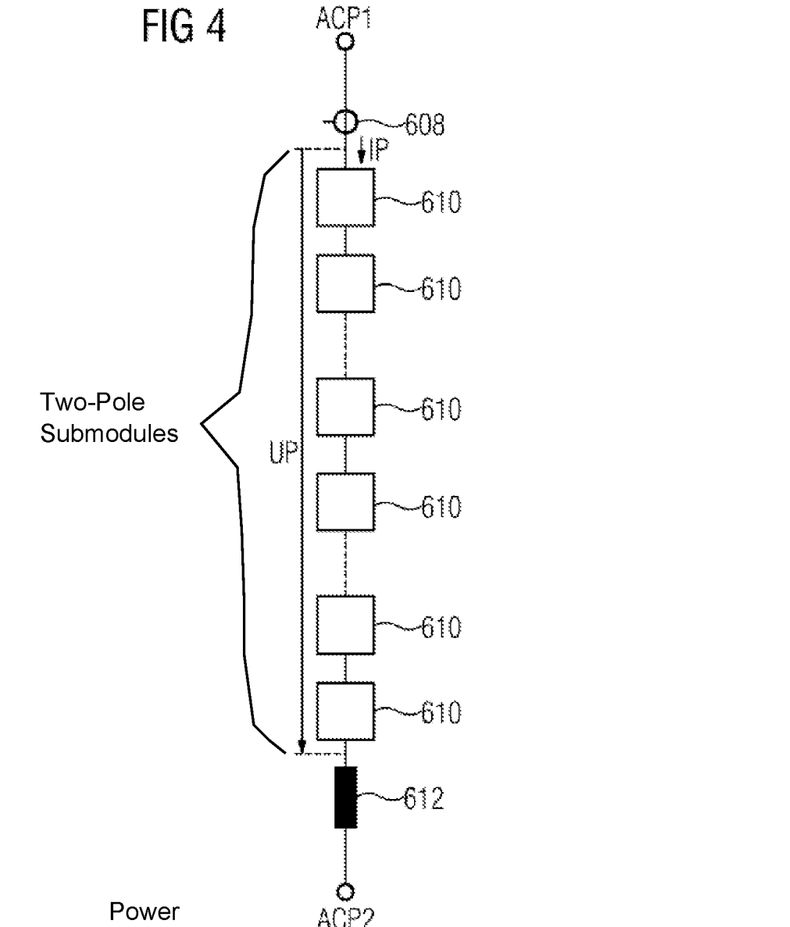
FIG. 4 shows a phase module.

FIG. 4 illustrates an exemplary embodiment of the phase module 210 in greater detail. The phase module 210 has a first connection AC1 and a second connection AC2. The first connection AC1 is electrically connected to a first two-pole submodule 610 via a current sensor 608. The first submodule 610 is electrically connected in series with further two-pole submodules 610; overall the phase module 210 here has for example 18 submodules 610. The last of the 18 two-pole submodules 610 is electrically connected to the second connection AC2 via a coupling inductance 612. The current IP flowing through the phase module 210 is measured by means of the current sensor 608. The first connection AC1 and the second connection AC2 can respectively be connected to a phase of the AC voltage power supply system 7.

Figure 5:
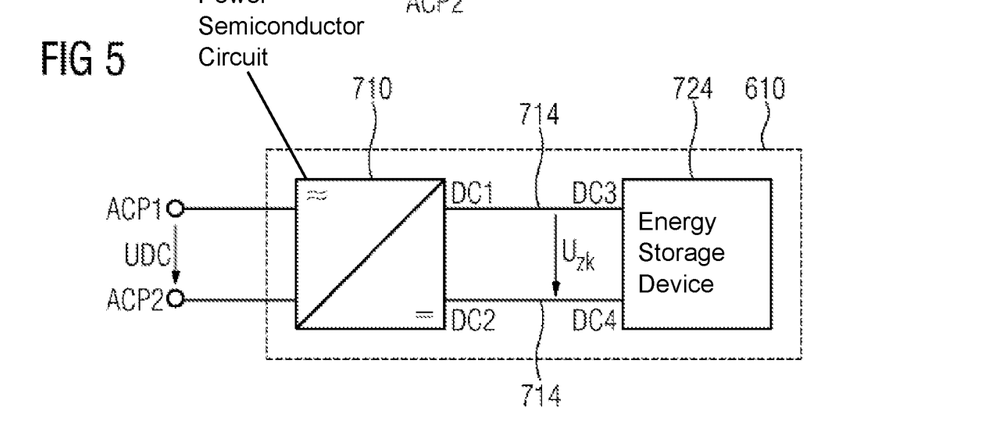
FIG. 5 shows a two-pole submodule.

FIG. 5 illustrates an exemplary embodiment of a two-pole submodule 610 in detail. The two-pole submodule 610 has a first submodule pole ACP1 and a second submodule pole ACP2.

The two submodule poles ACP1 and ACP2 are connected to a power semiconductor circuit 710 (to put it more precisely, to an AC voltage connection of the power semiconductor circuit 710). A DC voltage connection of the power semiconductor circuit 710 is connected to an energy store 724 via a DC voltage link 714. The DC voltage link 714 contains the energy store voltage Uzk, which is able to be switched on and off as a submodule voltage UDC and, after switch-on, is present as a switched-on submodule voltage UDC between the two submodule poles. After switch-off of the submodule voltage UDC, no voltage (or a zero voltage) is present between the two submodule poles. The power semiconductor circuit 710 is also referred to as a "power module".

Figure 6:
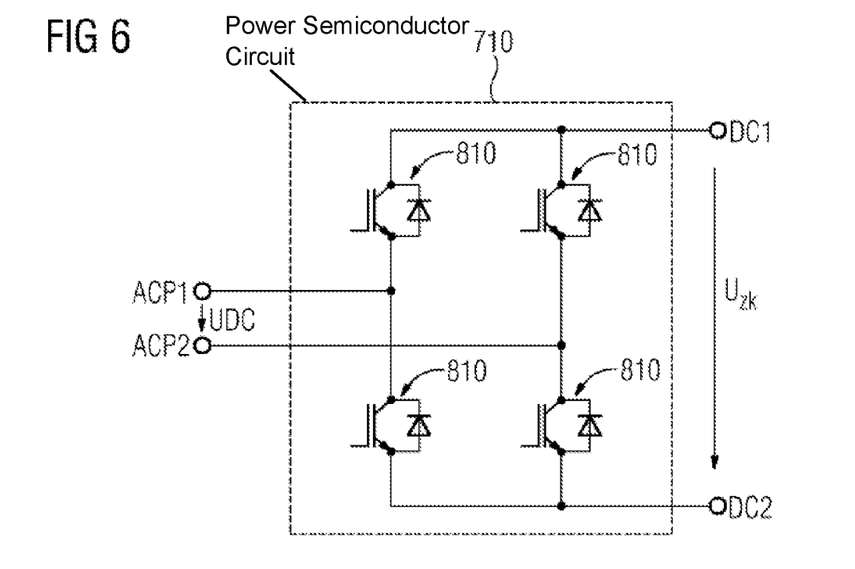
FIG. 6 shows a power semiconductor circuit comprising four semiconductor switches.

FIG. 6 illustrates an exemplary embodiment of the power semiconductor circuit 710. The power semiconductor circuit 710 has four semiconductor switches 810, which are able to be turned on and off. Each of the semiconductor switches 810 comprises a power semiconductor component with an antiparallel-connected diode. In the exemplary embodiment in FIG. 8, the power semiconductor component is an IGBT (Insulated Gate Bipolar Transistor). In other exemplary embodiments, however, the semiconductor component can also be configured differently, for example as an IGCT (Integrated Gate-Commutated Thyristor), IEGT (Injection-Enhanced Gate Transistor) or as a MOSFET (Metal-Oxide-Semiconductor Field-Effect Transistor). The four semiconductor switches 810 form a full-bridge circuit in the exemplary embodiment in FIG. 8. As a result, the polarity of the submodule voltage UDC present between the submodule poles ACP1 and ACP2 can be reversed.

Figure 7:
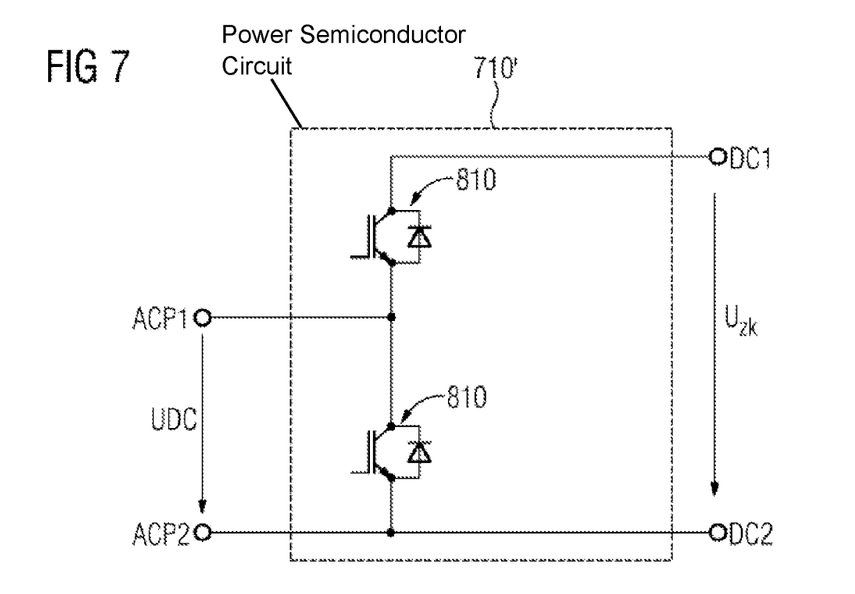
FIG. 7 shows a power semiconductor circuit comprising two semiconductor switches.

FIG. 7 illustrates a further exemplary embodiment of a power semiconductor circuit 710', which has only two power semiconductor switches 810 and is also only suitable for a multilevel power converter MMC in accordance with FIG. 3. The two power semiconductor switches 810 form a half-bridge circuit in the exemplary embodiment in FIG. 9. As a result, only a submodule voltage UDC of one polarity (and a zero voltage) can be output between the submodule poles ACP1 and ACP2.

Figure 8:
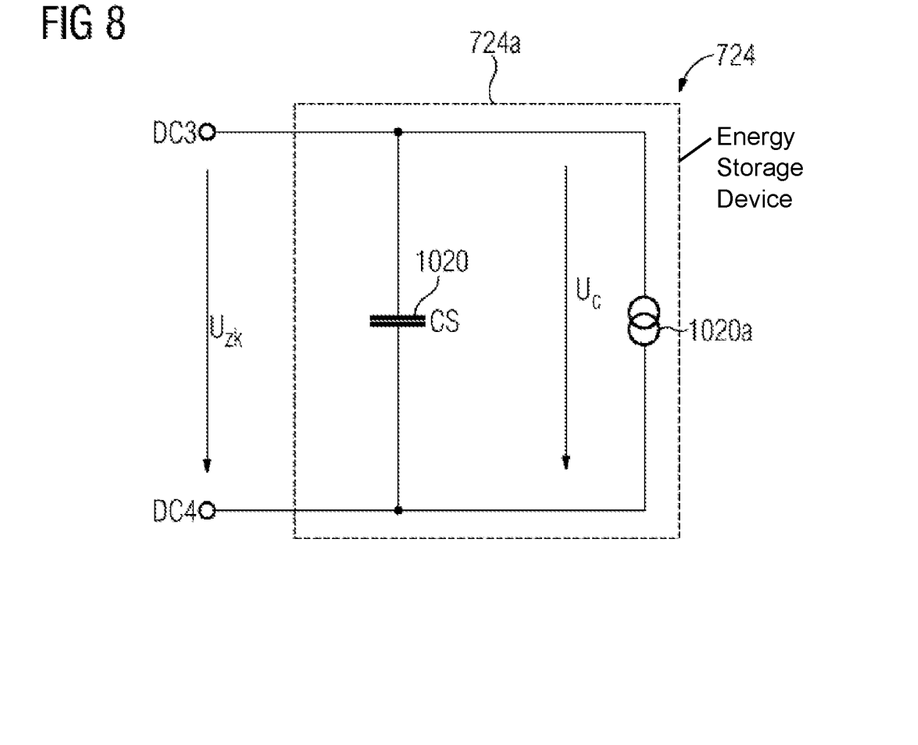
FIG. 8 shows an energy store in the form of a capacitor module.

FIG. 8 illustrates the energy store 724 in the form of a capacitor module 724a, which here consists of a capacitor C as energy store 1020 and a voltage measuring device 1020a connected in parallel, wherein the energy store voltage Uzk is present as capacitor voltage UC across the capacitor C and is buffered by the latter.

Figure 9:
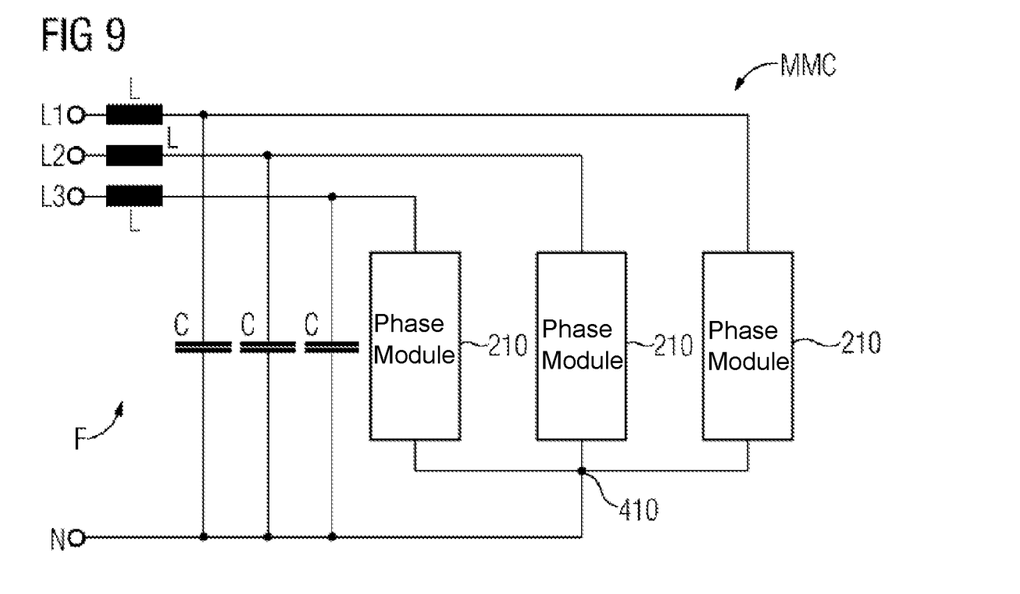
FIG. 9 shows a multilevel power converter comprising three phase modules in a star connection.

FIG. 9 shows an exemplary embodiment of a modular multilevel power converter MMC in which three phase modules 210 are connected in a star connection with system inductors L and filter capacitances C. In this case, connections of the three phase modules 210 are electrically connected to one another and form a star point 410. The star point 410 is connected to a return conductor N of the power supply system 7. The other three connections of the phase modules 210 in each case are respectively connected to a phase L1, L2 or L3 of the power supply system 7.

Figure 10:
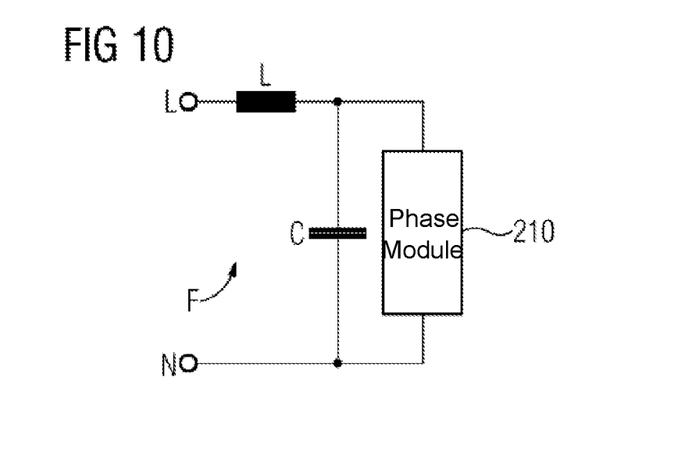
FIG. 10 shows a phase module that is connectable to a power supply system in a single-phase manner.

FIG. 10 also illustrates an individual phase module 210 that can be connected to a power supply system in a single-phase manner. In this case, this phase module 210 can be connected between a phase L and the return conductor N of the power supply system, as is illustrated in FIG. 10.

The multiphase multilevel power converter MMC thus has phase modules 210 formed in each case from a plurality of two-pole submodules 610 electrically connected in series. Each submodule 610 has in each case a plurality of semiconductor switches 810 and a capacitor C that is chargeable in a unipolar manner as an energy store 1020, wherein the energy store voltage Uzk dependent on the degree of charging of the energy store 1020 is able to be switched on and off as a submodule voltage UDC between the two submodule poles ACP1, ACP2 by the semiconductor switches 810 given a corresponding switching state of the semiconductor switches 810. In this case, the sum of the switched-on submodule voltages UDC forms in each case the connection voltage 21 having a predefined fundamental frequency. In order to damp components of the connection voltage 21 that are at higher frequency than the fundamental frequency, a passive frequency filter F is provided for each phase module 210. A portion of the submodules 610 here has in each case switched-on submodule voltages UDC and a portion of the submodules 610 has switched-off (that is to say not switched on) submodule voltages UDC. The drive (drive unit 15) has a digital regulator 15b, which corrects the deviation of the connection voltage (voltage sensor 18) from a predefined target voltage by virtue of the fact that it switches on switched-off submodule voltages UDC and switches off switched-on submodule voltages UDC (and in particular leaves switched-on submodule voltages UDC switched on) at respectively successive sampling instants ti with a predefined sampling frequency (1/Ti). The resonant frequency fr of the frequency filter F is above the sampling frequency (1/Ti). In addition to the regulator 15a, the controller 15b is part of the drive (drive unit 15).

Figure 11:
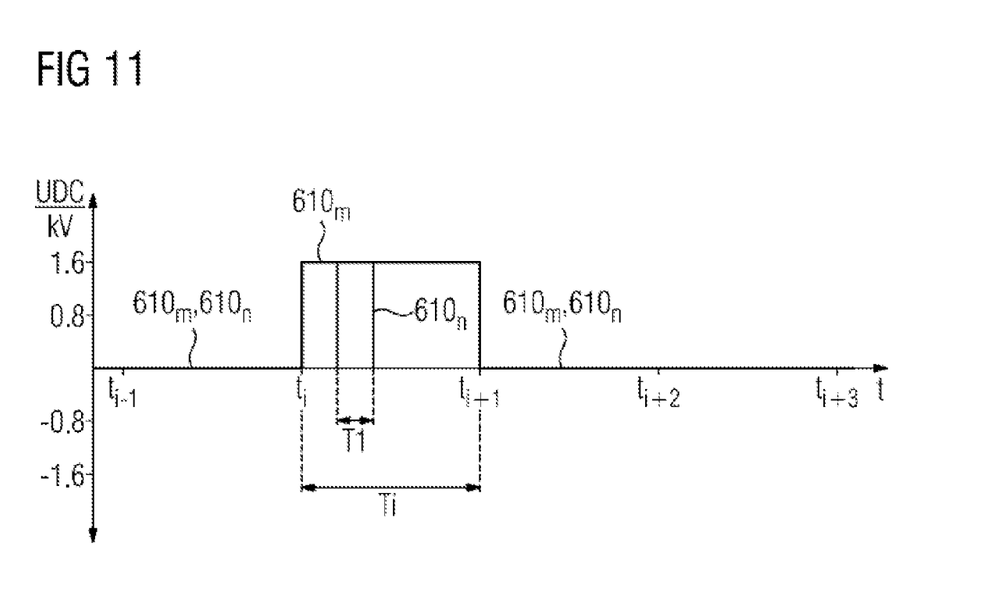
FIG. 11 shows the temporal profile of a submodule voltage switched on by the regulator of the multilevel power converter and of a submodule voltage briefly switched on additionally by a controller.

FIG. 11 shows by way of example the temporal profile of the submodule voltages UDC of a plurality of submodules 610, in particular a submodule voltage UDC of a submodule 610m that is switched on by the regulator 15a at the instant ti. Within the sampling interval T1 of the regulator 15a, with respect to the submodule voltage UDC of the submodule 610m switched on by the regulator 15a, the controller 15b then briefly (for a time shorter than the sampling interval T1) switches on and off again the submodule voltage UDC of one of the submodules that were switched off directly before that, here of the submodule 610n, once for a first time duration T1.

Figure 12:
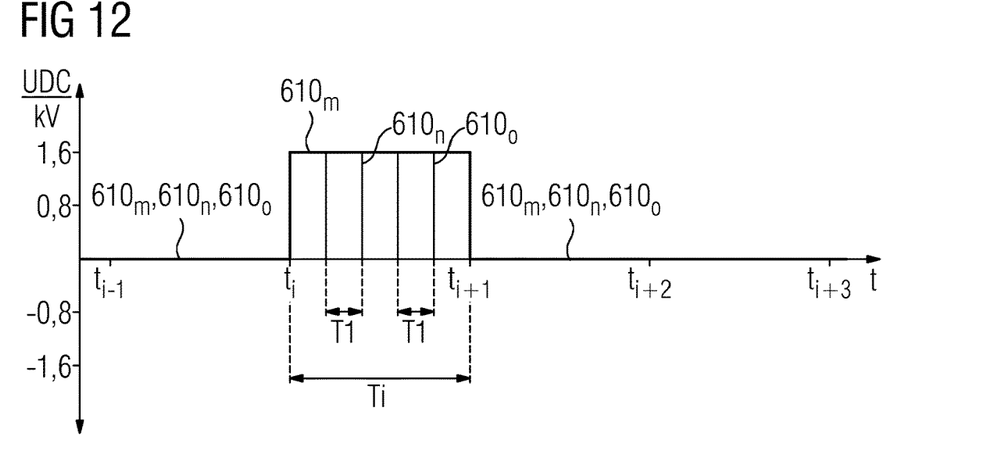
FIG. 12 shows two submodule voltages briefly switched on additionally by the controller.

FIG. 12 shows, like FIG. 11, the temporal profile of the submodule voltage UDC of the submodule 610m that is switched on by the regulator 15a at the instant ti. However, the controller 15b then briefly (for a time duration T1) switches on and off again two of the submodule voltages UDC that were switched off directly before that, here those of the submodules 610n, 610o, successively in a temporally spaced-apart manner.

In this case, it is also possible that, with respect to the submodule voltage UDC of the submodule 610m that is switched on by the regulator 15a, the controller 15b briefly switches on and switches off again one of the switched-off submodule voltages UDC (here that of the submodule 610n or of the submodule 610o) repeatedly in a temporally spaced-apart manner within a sampling interval T1.

The first time duration T1 is given by T1=1/(2*fr) where fr equals the resonant frequency.

Figure 13:
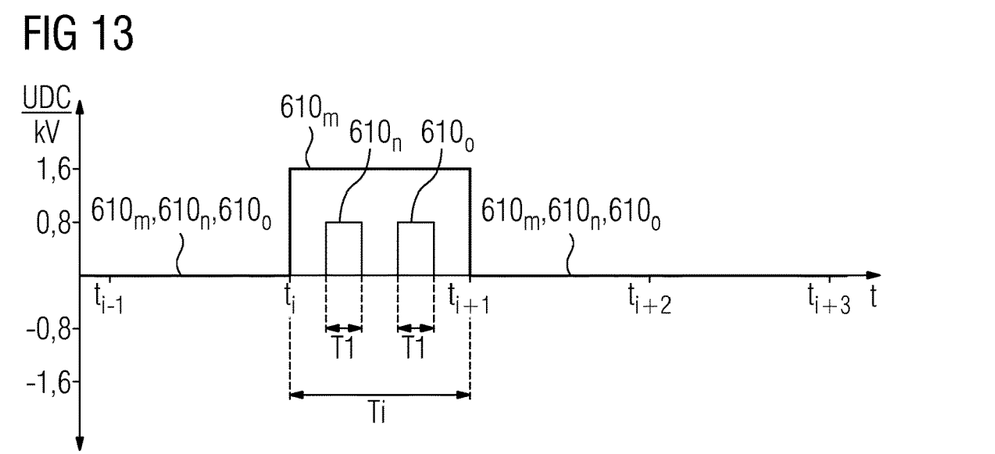
FIG. 13 shows two submodule voltages briefly switched on additionally by the controller with a half-magnitude voltage value.

FIG. 13 shows by way of example that a portion of the submodule voltages UDC that were respectively switched off directly before the instant ti (which here include the two submodule voltages UDC of the submodules 610n, 610o) has a smaller submodule voltage UDC than the other switched-off submodule voltages UDC, that is to say is operated with a smaller submodule voltage UDC, and that the controller 15 (briefly) switches on and switches off again only the smaller submodule voltages UDC (here those of the submodules 610n, 610o) in each case successively for a first time duration T1. By way of example, the magnitude of the smaller submodule voltage UDC can be half that of the other switched-off submodule voltages UDC, as illustrated by way of example in FIG. 13.

Figure 14:
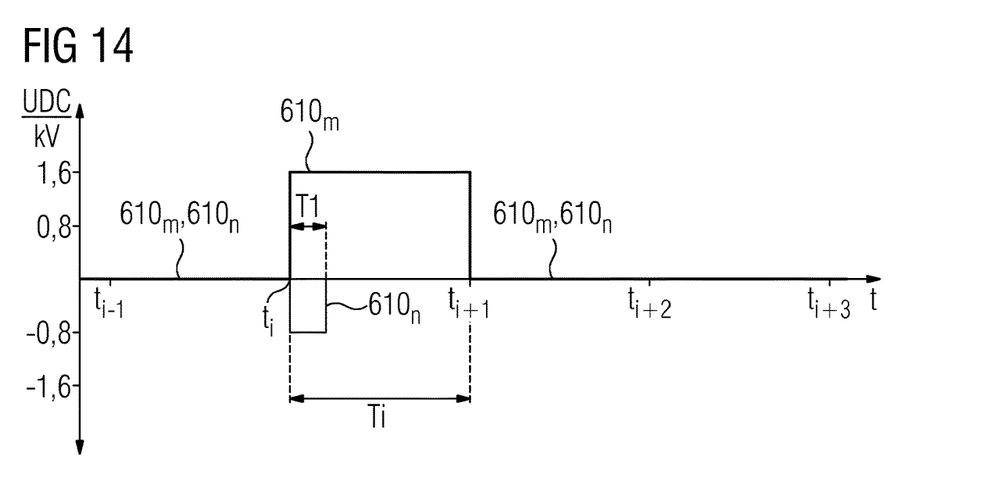
FIG. 14 shows a submodule voltage briefly switched on additionally by the controller with an inverted half-magnitude voltage value.

FIG. 14 shows again by way of example the temporal profile of the submodule voltage UDC of the submodule 610m that is switched on by the regulator 15a at the instant ti. With respect to the submodule voltage UDC of the submodule 610m that is switched on by the regulator 15a, simultaneously with the switching on of this submodule voltage UDC, the controller 15b then (briefly) switches on and subsequently switches off again the smaller submodule voltage UDC of the submodule 610n in an inverted manner for the first time duration T1. An inversion of the submodule voltage UDC presupposes, in terms of circuitry, that there are four semiconductor switches 810 present for each submodule 610.

Figure 15:
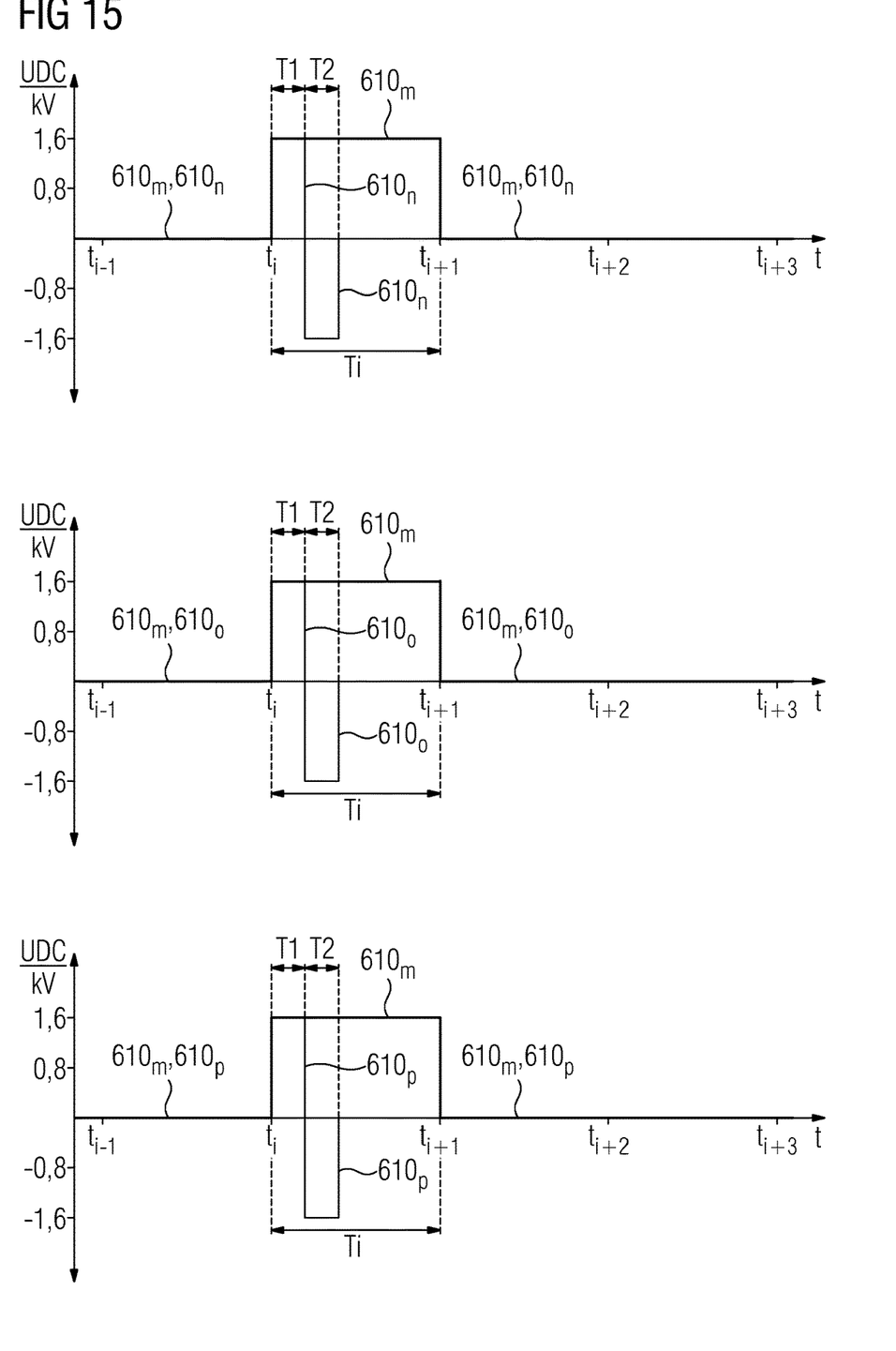
FIG. 15 shows three submodule voltages briefly switched on additionally.

FIG. 15 shows: for the case where all submodules 610 have the same (average) submodule voltage UDC, in each case with respect to a submodule voltage UDC of the submodule 610m that is switched on by the regulator 15a, the controller 15a can switch on and off again an odd number of N-1 (here e.g. three) submodule voltages UDC (here of the submodules 610n, 610o, 610p) for the first time duration T1, can then switch on and switch off again these submodule voltages UDC (here of the submodules 610n, 610o, 610p) with an opposite sign (that is to say in an inverted manner) for a second time duration T2 and, after the second time duration T2 has elapsed, can switch off again all submodule voltages UDC (here of the submodules 610n, 610o, 610p) switched on (additionally) by the controller 15b. The following must then hold true for the first and second time durations T1, T2 (here ^2 corresponds to raise to the power of 2, that is to say corresponds to the square):

$$T1=1/(2*pi*fr)*\arccos((4*(N*UDC)^2-2*(N*UDC)-UDC^2)/(4*(N*UDC)^2))$$

and $$T2=1/(2*pi*fr)*a\cos((2*(N*UDC)^2-2*(N*UDC)-UDC^2)/(2*(N+1)*UDC^2)).$$

In this case, the first and second time durations T1, T2 are to be chosen in a manner dependent on said number N-1 in relation to the total number M of submodules 610.

As illustrated to all intents and purposes in FIG. 11-FIG. 15, in terms of the method, within a sampling interval T1 of the regulator 15a, in each case with respect to a submodule voltage UDC (the submodule 610m in FIG. 11-FIG. 15) switched on by the regulator 15a, at least one of the switched-off submodule voltages UDC (of the submodule 610n or of the submodules 610n and 610o or of the submodules 610n and 610o and 610p in FIG. 11-FIG. 15) is (briefly) switched on and switched off again at least once for a time duration T1, T2 that is less than the sampling interval T1.

The submodule voltages UDC are in each case average submodule voltages UDC.

The invention claimed is:

1. A multiphase multilevel power converter, comprising:
   a phase module formed of a plurality of two-pole submodules electrically connected in series, each of said two-pole submodules having two submodule poles, a plurality of semiconductor switches and an energy storage device chargeable in a unipolar manner, said semiconductor switches configured to switch an energy storage device voltage on and off as a submodule voltage between said two submodule poles;
   a sum of switched-on submodule voltages forming a connection voltage having a predefined fundamental frequency;
   a passive frequency filter associated with said phase module for damping components of the connection voltage being at a higher frequency than a fundamental frequency;
   a portion of said plurality of submodules having switched-on submodule voltages and a portion of said plurality of submodules having switched-off submodule voltages;
   a drive having a digital regulator correcting a deviation of the connection voltage from a predefined target voltage by switching on switched-off submodule voltages and switching off switched-on submodule voltages at respectively successive sampling instants in accordance with a predefined sampling frequency;
   said passive frequency filter having a resonant frequency above the predefined sampling frequency; and
   said drive having a controller configured to switch on and switch off again at least one of the switched-off submodule voltages at least once for a first time duration, within a sampling interval of said digital regulator relative to a submodule voltage switched on by said digital regulator.

2. The multilevel power converter according to claim 1, wherein said controller switches on and switches off again a plurality of the respectively switched-off submodule voltages successively in a temporally spaced-apart manner, relative to a submodule voltage switched on by said digital regulator.

3. The multilevel power converter according to claim 1, wherein said controller switches on and switches off again one of the switched-off submodule voltages repeatedly in a temporally spaced-apart manner, relative to a submodule voltage switched on by said digital regulator.

4. The multilevel power converter according to claim 1, wherein the first time duration is given by $T1=1/(2*fr)$ where fr equals the resonant frequency.

5. The multilevel power converter according to claim 1, wherein a portion of the respectively switched-off submodule voltages has a smaller submodule voltage than other switched-off submodule voltages, and said controller only switches on and switches off again the smaller (average) submodule voltages for the first time duration.

6. The multilevel power converter according to claim 5, wherein a magnitude of the smaller submodule voltage is half of a magnitude of the other switched-off submodule voltages.

7. The multilevel power converter according to claim 1, wherein said controller switches on and subsequently switches off again the smaller submodule voltage in an inverted manner for the first time duration, simultaneously with the switching on of a submodule voltage switched on by said digital regulator.

8. The multilevel power converter according to claim 1, wherein:
all of said plurality of submodules have an identical submodule voltage;
said controller switches on and switches off again an odd number of said submodule voltages UDC for the first time duration T1, then switches on said submodule voltages with an opposite sign for a second time duration and, after the second time duration T2 has elapsed, switches off again all submodule voltages switched on by said controller, relative to a submodule voltage switched on by said regulator; and
for the first and second time durations:

$$T1=1/(2*pi*fr)*\arccos((4*(N*UDC)^2-2*(N*UDC)-UDC^2)/(4*(N*UDC)^2)) \text{ and}$$

$$T2=1/(2*pi*f\_r)*a\cos((2*(N*UDC)^2-2*(N*UDC)-UDC^2)/(2*(N+1)*UDC^2)).$$

9. The multilevel power converter according to claim 8, wherein the first and second time durations are dependent on a number relative to a total number of said plurality of submodules.

10. A method for driving a multiphase multilevel power converter, the method comprising:
providing the multiphase multilevel power converter with a phase module formed of a plurality of two-pole submodules electrically connected in series, each of the two-pole submodules having a plurality of semiconductor switches and an energy storage device chargeable in a unipolar manner, the semiconductor switches configured to switch an energy storage device voltage on and off as a submodule voltage between two submodule poles;
using a sum of the switched-on submodule voltages to form a connection voltage having a predefined fundamental frequency;
using a passive frequency filter provided for each phase module to damp components of the connection voltage being at a higher frequency than a fundamental frequency;
providing a portion of the submodules with switched-on submodule voltages and a portion of the submodules with switched-off submodule voltages;
providing the frequency filter with a resonant frequency above a predefined sampling frequency;
using a digital regulator, at respectively successive sampling instants, to detect deviations of the connection voltage from a predefined target voltage and to switch on at least one of the switched-off submodule voltages or switch off at least one of the switched-on submodule voltages; and
within a sampling interval of the digital regulator, relative to a submodule voltage switched on by the digital regulator, switching on and switching off again at least one of the switched-off submodule voltages at least once for a first time duration being less than the sampling interval.

* * * * *